United States Patent [19]

Marlatt et al.

[11] 4,427,624
[45] Jan. 24, 1984

[54] COMPOSITE NOZZLE DESIGN FOR REACTOR FUEL ASSEMBLY

[75] Inventors: George R. Marlatt, Monroeville; David K. Allison, N. Huntingdon Township, Irwin County, both of Pa.

[73] Assignee: Westinghouse Electric Corp., Pittsburgh, Pa.

[21] Appl. No.: 239,787

[22] Filed: Mar. 2, 1981

[51] Int. Cl.³ .................................................. G21C 1/04
[52] U.S. Cl. .................................. 376/352; 376/440; 376/442; 376/446
[58] Field of Search ............... 376/352, 365, 434, 440, 376/442, 446

[56] References Cited

U.S. PATENT DOCUMENTS

| | | | |
|---|---|---|---|
| 3,182,003 | 5/1965 | Thorp et al. | 376/442 |
| 3,330,734 | 7/1967 | Ashcroft et al. | 376/446 X |
| 3,377,254 | 4/1968 | Frisch | 376/442 |
| 3,389,056 | 6/1968 | Frisch | 376/442 X |
| 3,475,273 | 10/1969 | Krawiek | 376/440 |
| 3,791,466 | 2/1974 | Patterson et al. | 376/442 |
| 3,801,453 | 4/1974 | Jones | 376/440 |
| 4,123,327 | 10/1978 | Sugisaki et al. | 376/440 X |

FOREIGN PATENT DOCUMENTS 662123 4/1963 Canada ................................. 176/78

*Primary Examiner*—Peter A. Nelson
*Attorney, Agent, or Firm*—D. E. Erickson; Z. L. Dermer

[57] ABSTRACT

A composite nozzle for a fuel assembly adapted for installation on the upper or lower end thereof and which is constructed from two components. The first component includes a casting weldment or forging designed to carry handling loads, support fuel assembly weight and flow loads, and interface with structural members of both the fuel assembly and reactor internal structures. The second component of the nozzle consists of a thin stamped bore machine flow plate adapted for attachment to the casting body. The plate is designed to prevent fuel rods from being ejected from the core and provide orifices for coolant flow to a predetermined value and pressure drop which is consistent with the flow at other locations in the core.

1 Claim, 7 Drawing Figures

COMPOSITE NOZZLE DESIGN FOR REACTOR FUEL ASSEMBLY

BACKGROUND OF THE INVENTION

The invention described herein relates to nuclear reactor fuel assemblies and more particularly to an improved design of top and bottom nozzles which increase fuel assembly performance.

Conventional commercial nuclear reactors include a multiplicity of fuel assemblies, each including a parallel array of fuel rods and control rod guide thimbles held in radially spaced relationship with each other by grids spaced along the fuel assembly length. To provide strength and stability to the assembly, the guide thimbles are secured to the grids and to top and bottom nozzles mounted on opposite ends of the assembly. Each nozzle is of solid one piece construction equipped with openings to accept the guide thimble ends and to accommodate coolant flow upwardly through the assembly during reactor operation. The ligaments utilized to form the nozzle coolant openings are so located above fuel rods to limit their upward movement or even their escape from the assembly when acted on by hydraulic forces in the reactor.

Current fuel assembly end nozzles are designed to carry the structural and thermal loads during both handling and operation and to control the flow of coolant through the ends of the fuel assembly. Also, the nozzles provide the structure to which the control rod guide thimbles are secured to furnish stability to the assembly while returning the rods within the confines of the assembly. The requirements are satisfied by utilizing nozzles of a single or one piece construction which includes spaced plates joined by side walls to form the nozzle body. This one piece design of nozzle used the same features in an attempt to satisfy all the above requirements. As a result, the design features incorporated in the nozzle became complex and expensive to manufacture particularly since different structural features could not be changed at the expense of others, i.e., the proposed design changes in each structural component could not be made if they adversely affect the function or performance of other components in the nozzle. For example, the ligaments which act to preclude upward displacement of fuel rods from the assembly also constitute thermal and hydraulic load bearing members, thus requiring the ligaments to be made substantially heavier than would otherwise be necessary. The nozzle manufacturing process also is unusually expensive since the multitude of flow openings must be cut milled to precise configurations and tolerances, which requires machines having large cutting radiuses plus still being capable of achieving fine dimensions or tolerances.

SUMMARY OF THE INVENTION

Briefly stated, the above disadvantages are overcome by the present invention by providing a fuel assembly nozzle of dual construction which includes a casting designed to carry handling loads and to support a fuel assembly weight and coolant flow loads together with interfacing with structural members of both the fuel assembly and reactor internal structures. The second component of the nozzle includes a removable flow plate of stamped or machined material which serves to limit fuel rod upward movement and to control coolant flow to a value which is consistent with the flow at other localities in the core.

BRIEF DESCRIPTION OF THE DRAWINGS

While the foregoing discussion identifies problems presently existing in the prior art together with a general description of how they may be overcome, it is believed the following disclosure of the preferred embodiment of the invention will be better understood by reference to the accompanying drawings wherein.

DESCRIPTION OF THE PREFERRED EMBODIMENT

Figure 1:
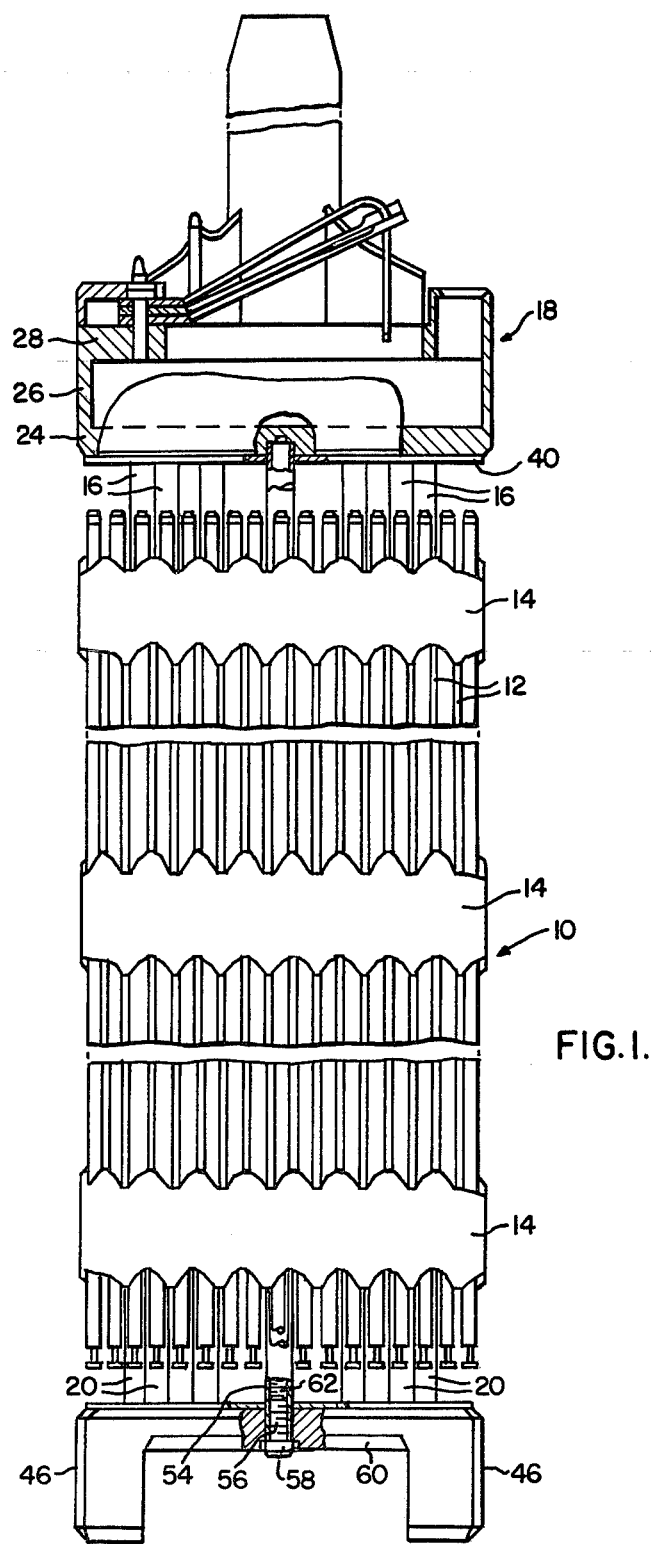
FIG. 1 is a view in elevation, partly in section, showing the invention applied to a reactor fuel assembly.

Referring now to the drawings wherein like reference characters designate like or corresponding parts throughout the several views, there is shown in FIG. 1 a fuel assembly 10 including an array of fuel rods 12 held in spaced relationship with each by grids 14 spaced along the fuel assembly length. Control rod guide tubes and their associated sleeves 16 connect the fuel assembly with an upper or top nozzle 18 while sleeves 20 connect the fuel assembly at its lower end to the bottom nozzle 22.

Figure 2:
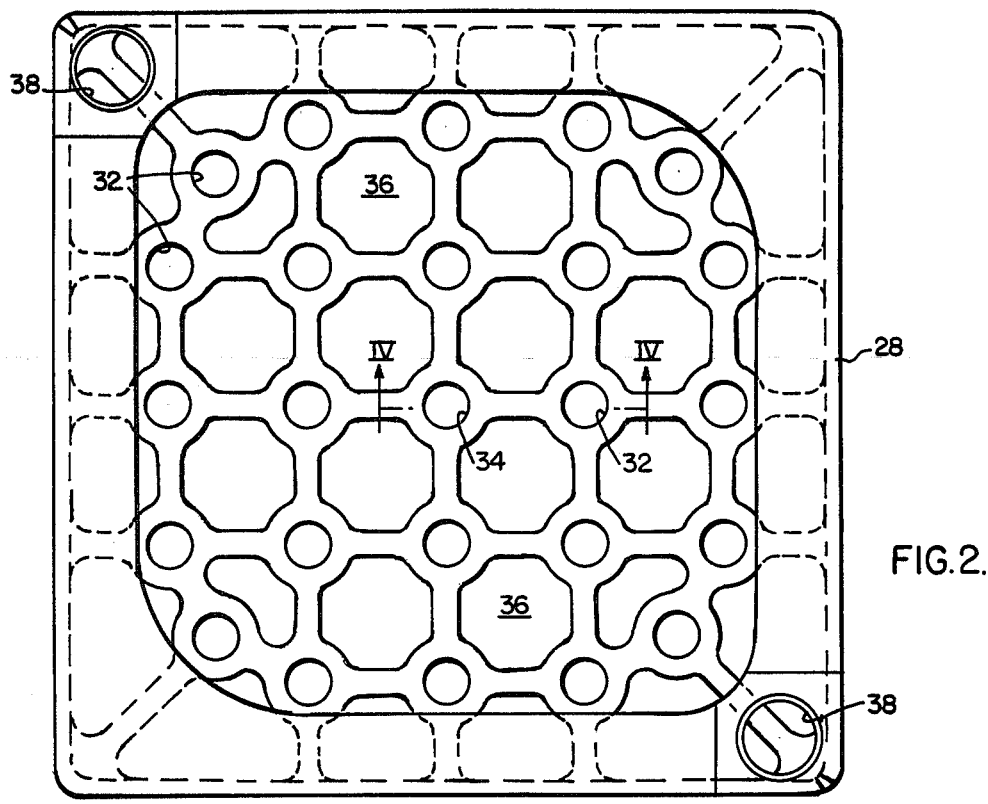
FIG. 2 is a plan view of the composite top nozzle illustrated in FIG. 1.
Figure 3:
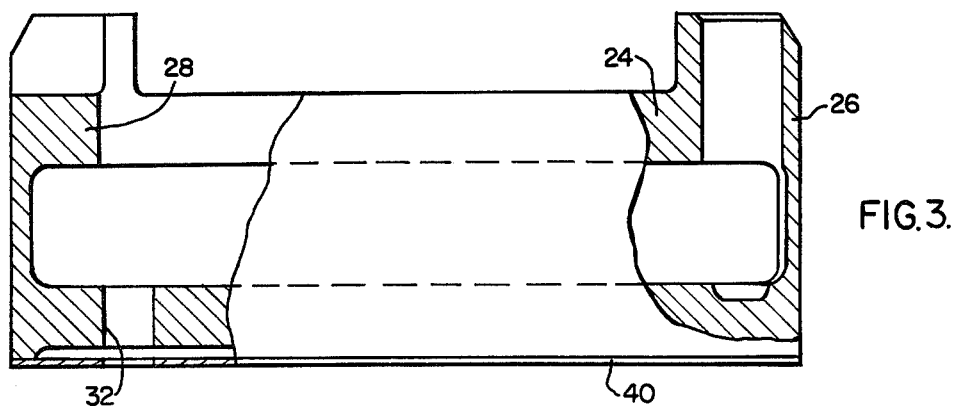
FIG. 3 is an end view, partly in section, of the nozzle shown in FIG. 2.
Figure 5:
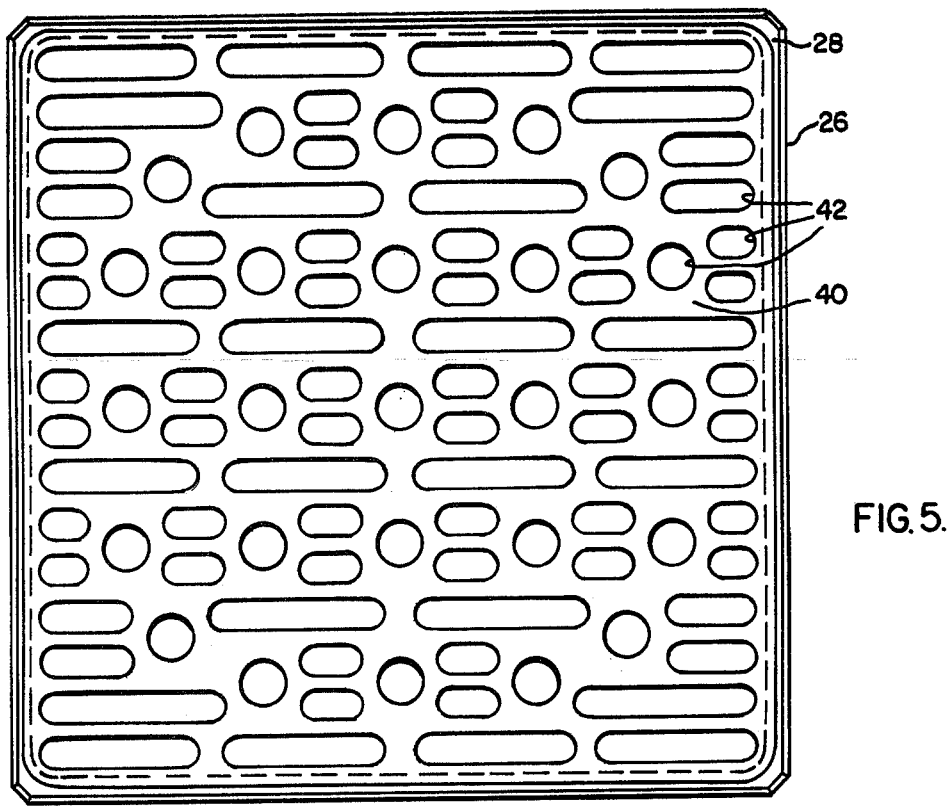
FIG. 5 is a plan view of the removable top plate in the assembly.
Figure 4:
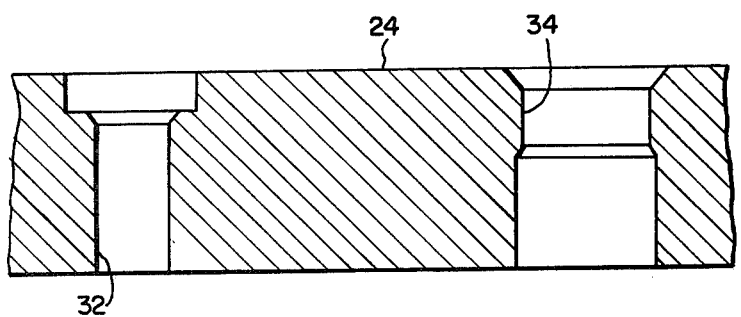
FIG. 4 is a view taken on lines IV—IV of FIG. 2.
Figure 7:
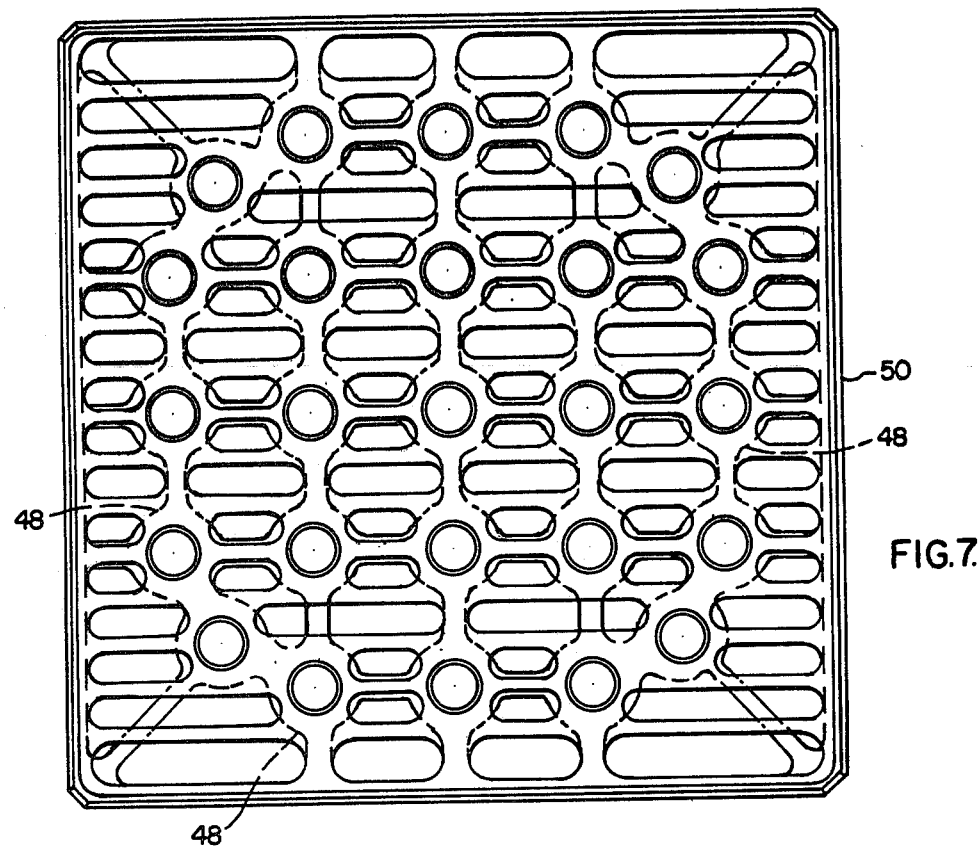
FIG. 7 is a plan view of the nozzle of FIG. 6.
Figure 6:
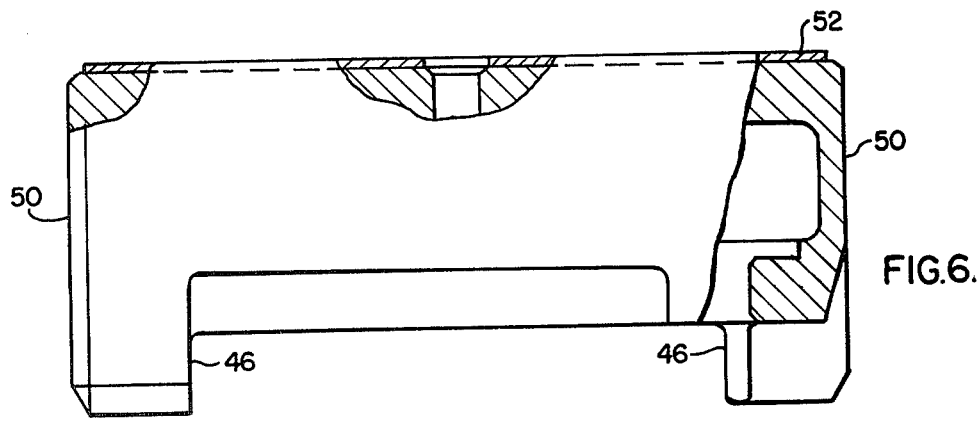
FIG. 6 is a view in elevation, partly in section of a fuel assembly bottom nozzle.

The upper nozzle includes a casting having a base 24 and upstanding walls 26 which merge into an overhanging flange or ledge 28 extending around the upper portion of the nozzle body. Referring to FIGS. 2-4, the base includes an interconnecting network of ribs 30 of sufficient width to contain openings 32 which receive the control rod guide tubes (not shown) and opening 34 for instrumentation leads. The larger size openings shown are coolant flow holes designed to accept the full flow of coolant through the assembly. Diagonally disposed openings 38 receive dowels attached to the upper core plate (not shown) when the reactor is loaded with fuel assemblies and assembled for operation. As illustrated in FIGS. 1, 3 and 5, a removable flow plate 40 having multiple openings 42 of varying size and configuration is welded or otherwise secured to the underside of base 24 on the top nozzle. The openings 42 are of special design to help direct the flow of coolant in a predetermined path through the fuel assembly and to assure that a pressure drop of predetermined magnitude will take place across the assembly.

The bottom nozzle 22 is similar in design to the top nozzle and includes a solid casting of stainless steel or other material. It includes legs 46 which support a network of ribs 48 similar in design to those in the top nozzle and which are integrally formed with the casting walls 50. A removable bottom flow plate 52 may be secured to the casting by welding its ends to the casting top surface. In the preferred form of the invention, the control rod guide thimble sleeve 54 which is attached at its upper end to the bottom grid 14, rests on the flow plate 52. A threaded screw 56 having a head 58 bearing against the nozzle bottom surface 60, is secured in complementary threads 62 formed on the inner portion of the sleeve to thereby firmly attach the bottom nozzle to the guide thimble structure. Since 16 guide thimble sleeves 54 used in a 17×17 grid for example, have their bottom ends in contact with the flow plate 54 upper surface, it is apparent that as the screws are tightened in position, the flow plate will be drawn into firm engagement with the nozzle upper surface.

It will be apparent that many modifications and variations are possible in light of the above teachings. It therefore is to be understood that within the scope of the appended claims, the invention may be practiced other than as specifically described.

I claim:

1. A nozzle for use with a nuclear reactor fuel assembly in a nuclear reactor, the fuel assembly having fuel rods held by grids, the grids permitting the possibility of upward movement of the fuel rods from the fuel assembly when the fuel rods are acted on by hydraulic forces in the reactor, the nozzle comprising:

the casting of square configuration having walls which form a central opening through which coolant flows in an axial direction;

ribs in said casting extending across the central opening, said ribs including arms integrally joined with the casting walls and forming openings for allowing coolant flow through the nozzle;

a separable removable plate on said casting of a size which corresponds with the size of the central opening, said plate being of a thickness which permits it to be stamped from sheet material;

said plate further having spaced ligaments defining axially extending openings therein designed to a size and configuration for directing coolant flow in predetermined directions through the nozzle, and for causing a pressure drop of predetermined magnitude across the nozzle to help assure flow of coolant in the desired amount through the nozzle, the ligaments having a thickness which permits them to be stamped from sheet material with the ligaments being disposed to overlie the ends of all said fuel rods when the nozzle is attached to the fuel assembly, and thus prevent ejection of the fuel rods by hydraulic forces which act therein during operation in the reactor.

* * * * *